R. & A. RUNNION.
BURNER.
APPLICATION FILED MAR. 15, 1911.

1,034,304.

Patented July 30, 1912.

Witnesses
J. H. Crawford
E. Edwardson Jr.

Inventors
Robert Runnion,
Alonzo Runnion,

By Victor J. Evans
Attorney

UNITED STATES PATENT OFFICE.

ROBERT RUNNION AND ALONZO RUNNION, OF SPENCER, WEST VIRGINIA.

BURNER.

1,034,304.  Specification of Letters Patent.  Patented July 30, 1912.

Application filed March 15, 1911. Serial No. 614,648.

*To all whom it may concern:*

Be it known that we, ROBERT RUNNION and ALONZO RUNNION, citizens of the United States, residing at Spencer, in the county of Roane and State of West Virginia, have invented new and useful Improvements in Burners, of which the following is a specification.

This invention relates to burners and more particularly to gas burners, the object of the invention being to provide a burner wherein its parts may be so adjusted that the size of the flame may be increased in area without increasing the flow of gas.

A further object of the invention is the provision of a burner which may be converted from an ordinary heating burner into a simmer or pilot burner.

Further objects of the invention will appear as the following specific description is read in connection with the accompanying drawing, which forms a part of this application, and in which:—

Figure 1:
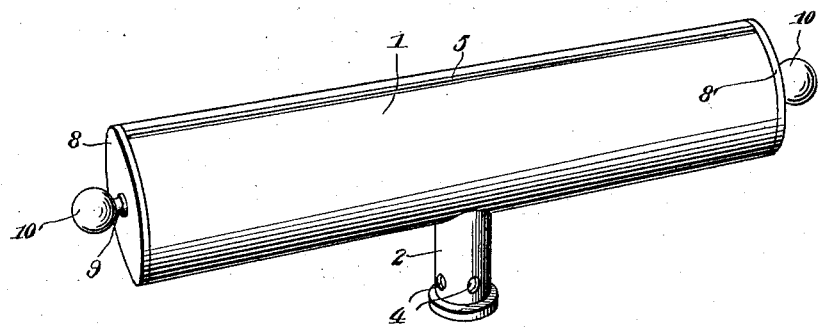
Figure 2:
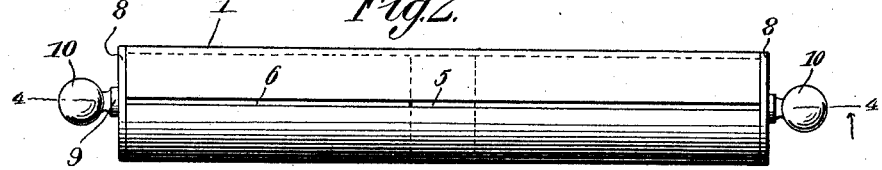
Figure 3:
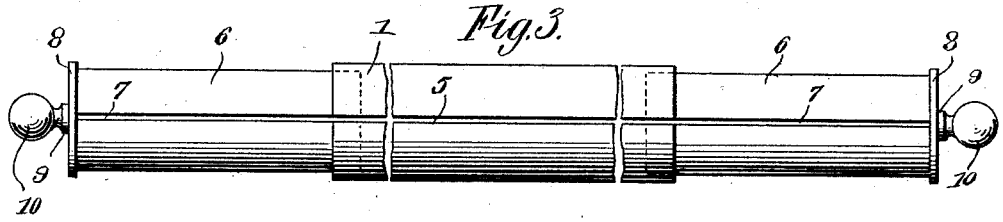
Figure 4:
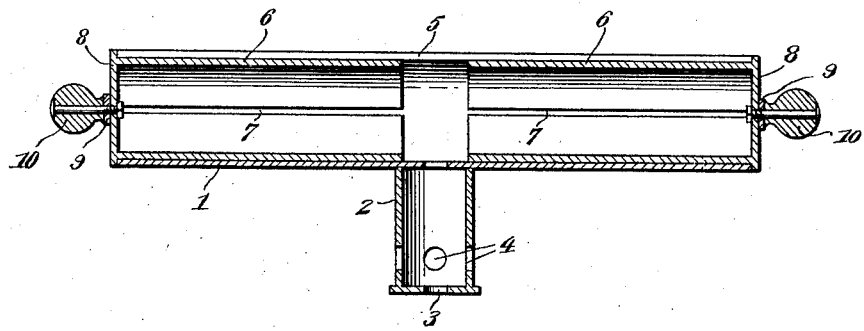

Figure 1 is a perspective view of the device. Fig. 2 is a top plan view showing the device arranged as a simmer or pilot burner. Fig. 3 is a similar view showing the burner caps extended to their full length. Fig. 4 is a transverse section on the line 4—4 of Fig. 2.

Referring more particularly to the drawings, the burner proper consists of a cylindrical tube 1 having depending from its lower side and communicating with the interior thereof, a mixing tube 2 having an opening 3 in its under side and suitable air inlets 4 in its vertical sides. The top of the casing 1 is provided with a slot 5 which extends throughout its length and slidably mounted in the ends of the casing or tube are adjusting caps 6 having slots 7 extending throughout their lengths and adapted to register with the slot 5 in the casing 1. These caps are closed by the end pieces 8 which limit their movement in the casing and the caps are freely rotatable in the casing so that the slots 5 and 7 may be carried out of register. Secured to the end pieces 8 and separated therefrom by heat insulating washers 9 are operating buttons 10 by which the caps may be manipulated when the burner is being used.

When the device is arranged as a simmer burner, the caps are turned so as to carry the slots 7 out of register with the slot 5 and the caps pushed into the casing 1 to their limit of movement. When the burner is arranged for an ordinary heating burner, the slots 7 are brought into register with the slot 5 and when it is desired to increase the area of gas distribution the caps are pulled out to their full extent or to any required degree, still keeping the slots 7 in register with the slot 5.

Having thus described the invention, what we claim as new is:—

A burner comprising a tubular casing having a slot extending its full length, independent end caps for closing the ends of said casing, said end caps having slots to register with the slot in the casing and being revolubly and slidably mounted in the casing, and means for manipulating said caps.

In testimony whereof we affix our signatures in presence of two witnesses.

ROBERT RUNNION.
ALONZO RUNNION.

Witnesses:
J. H. CAMP,
J. M. GEARY.

---

Copies of this patent may be obtained for five cents each, by addressing the "Commissioner of Patents, Washington, D. C."